United States Patent
Ohta et al.

(10) Patent No.: US 9,102,853 B2
(45) Date of Patent: *Aug. 11, 2015

(54) TWO-PART CURABLE OXYGEN-ABSORBABLE RESIN COMPOSITION, AND OXYGEN-ABSORBABLE ADHESIVE AGENT

(75) Inventors: Yoshihiro Ohta, Yokohama (JP); Yoichi Ishizaki, Yokohama (JP); Yui Asano, Yokohama (JP)

(73) Assignee: Toyo Seikan Group Holdings, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/995,456

(22) PCT Filed: Dec. 26, 2011

(86) PCT No.: PCT/JP2011/080003
§ 371 (c)(1),
(2), (4) Date: Jun. 18, 2013

(87) PCT Pub. No.: WO2012/090900
PCT Pub. Date: Jul. 5, 2012

(65) Prior Publication Data
US 2013/0280537 A1 Oct. 24, 2013

(30) Foreign Application Priority Data
Dec. 28, 2010 (JP) ................................. 2010-293225

(51) Int. Cl.
C09J 167/02 (2006.01)
B32B 27/40 (2006.01)
C08G 18/42 (2006.01)
C09J 175/04 (2006.01)
C08G 18/73 (2006.01)

(52) U.S. Cl.
CPC ........... *C09J 167/02* (2013.01); *C08G 18/4213* (2013.01); *C08G 18/73* (2013.01); *C09J 175/04* (2013.01); *Y10T 428/31551* (2015.04)

(58) Field of Classification Search
CPC .. C08G 18/23; C08G 18/722; C08G 18/4213; C08G 63/183; C09J 67/02; C09J 175/04; Y10T 428/31551
USPC ..................... 428/423.1; 252/183.11, 188.28; 524/601
See application file for complete search history.

(56) References Cited

U.S. PATENT DOCUMENTS

| | | | |
|---|---|---|---|
| 5,254,199 A * | 10/1993 | Stepanski et al. .......... | 156/307.3 |
| 6,527,976 B1 | 3/2003 | Cai et al. | |
| 7,288,313 B2 * | 10/2007 | Sasaki et al. ................... | 428/216 |
| 7,696,300 B2 * | 4/2010 | Ohta et al. ..................... | 528/307 |
| 7,910,185 B2 | 3/2011 | Ishizaki et al. | |
| 8,673,173 B2 * | 3/2014 | Ishizaki et al. ........... | 252/188.28 |
| 2004/0115445 A1 | 6/2004 | Sasaki et al. | |
| 2008/0227912 A1 | 9/2008 | Ohta et al. | |
| 2009/0098323 A1 | 4/2009 | Ohta et al. | |
| 2010/0087619 A1 | 4/2010 | Ohta et al. | |
| 2011/0028582 A1 * | 2/2011 | Leimenstoll et al. ......... | 521/172 |
| 2012/0001121 A1 | 1/2012 | Ishizaki et al. | |
| 2013/0143734 A1 | 6/2013 | Ohta et al. | |

FOREIGN PATENT DOCUMENTS

| | | |
|---|---|---|
| CN | 1950424 A | 4/2007 |
| CN | 101466761 A | 6/2009 |
| CN | 103180401 A | 6/2013 |
| JP | 2006131699 A | 5/2006 |
| JP | 2008007739 A | 1/2008 |
| JP | 2008038126 A | 2/2008 |
| JP | 2010229409 A | 10/2010 |
| KR | 20030090724 A | 11/2003 |
| WO | WO-2006080500 A1 | 8/2006 |
| WO | WO-2010101290 A1 | 9/2010 |
| WO | WO-2012023555 A1 | 2/2012 |

OTHER PUBLICATIONS

International Search report for PCT/JP2011/080003 dated Apr. 10, 2012.
Written Opinion of the International searching Authority for PCT/JP2011/080003 dated Apr. 10, 2012.
Office Action in Application No. CN 201180067391.3 dated Jul. 15, 2014.
Liu Yi Jun, Polyurethane Raw Materials and Additives Handbook, Chemical Industry Press (CN), Apr. 2005, pp. 19 and 31.
Office Action in Korean Application No. 10-2013-7019776 dated Feb. 13, 2015.
English Translation of Office Action in Korean Application No. 10-2013-7019776 dated Feb. 13, 2015.

* cited by examiner

*Primary Examiner* — Thao T Tran
(74) *Attorney, Agent, or Firm* — Marshall, Gerstein & Borun LLP

(57) ABSTRACT

The purpose of the present invention is to provide a two-part curable oxygen-absorbable resin composition which has all of oxygen absorbability, adhesion properties and a cohesive force. The present invention provides a two-part curable oxygen-absorbable resin composition comprising: a main component which comprises a polyester polyol containing tetrahydrophthalic acid or a derivative thereof or tetrahydrophthalic acid anhydride or a derivative thereof as a raw material; and an aliphatic and/or alicyclic isocyanate curing agent component.

5 Claims, No Drawings

TWO-PART CURABLE OXYGEN-ABSORBABLE RESIN COMPOSITION, AND OXYGEN-ABSORBABLE ADHESIVE AGENT

TECHNICAL FIELD

The present invention relates to a two-part curable oxygen-absorbable resin composition and an oxygen-absorbable adhesive agent which are excellent in adhesion, cohesive force, and oxygen-absorbing property.

BACKGROUND ART

For improving content storage performances, various gas-barrier packaging materials have been proposed. In particular, oxygen-absorbable packaging containers obtained by using materials having oxygen-absorbing performances for packaging containers have attracted attention recently. A method in which an oxygen-absorbable resin composition is applied as a coating material or an adhesive agent has been proposed as a method for achieving an oxygen-absorbable packaging container.

Patent Literature 1 proposes an oxygen-absorbable adhesive agent obtained by blending an inorganic oxide having oxygen-absorbing property with a polyol. However, the oxygen-absorbable adhesive agent has the following problems and the like. Specifically, the oxygen-absorbable adhesive agent is opaque, and poor in oxygen-absorbing performances. Moreover, the oxygen-absorbable adhesive agent cannot be used in a dry atmosphere, because the expression of the oxygen-absorbing performances requires water. Meanwhile, coating materials and adhesive agents using various oxygen-absorbable resin compositions have been proposed (for example, Patent Literatures 2 to 4). However, there is no case where oxygen-absorbing property, adhesion, and cohesive force are all achieved.

CITATION LIST

Patent Literatures
[Patent Literature 1] Japanese Patent Application Publication No. 2006-131699
[Patent Literature 2] International Publication No. WO2006/080500
[Patent Literature 3] Japanese Patent Application Publication No. 2008-7739
[Patent Literature 4] Japanese Patent Application Publication No. 2010-229409

SUMMARY OF INVENTION

Technical Problem

Accordingly, an object of the present invention is to provide a two-part curable oxygen-absorbable resin composition and an oxygen-absorbable adhesive agent having all of oxygen-absorbing property, adhesion, and cohesive force.

Solution to Problem

The present invention provides a two-part curable oxygen-absorbable resin composition comprising: a main agent comprising a polyester polyol comprising a tetrahydrophthalic acid, a derivative thereof, a tetrahydrophthalic anhydride, or a derivative thereof as a raw material; and an aliphatic and/or alicyclic isocyanate-based curing agent component.

Moreover, the present invention provides an oxygen-absorbable adhesive agent comprising the two-part curable oxygen-absorbable resin composition.

Furthermore, the present invention provides an oxygen-absorbable laminate film comprising at least: an oxygen barrier film layer; an oxygen-absorbable layer made of the oxygen-absorbable adhesive agent; and a sealant film layer.

Advantageous Effects of Invention

A flexible packaging material having an excellent oxygen removal performance can be easily produced at low costs by using the two-part curable oxygen-absorbable resin composition of the present invention as an adhesive agent for a multilayer packaging material, for example, as an alternative to conventional adhesive agents for dry lamination. This oxygen-absorbing flexible packaging material makes it possible to keep for long periods the qualities of foods, pharmaceuticals, electronic components, and the like which are sensitive to oxygen.

DESCRIPTION OF EMBODIMENTS

A two-part curable oxygen-absorbable resin composition of the present invention comprises: a main agent comprising a polyester polyol comprising a tetrahydrophthalic acid, a derivative thereof, a tetrahydrophthalic anhydride, or a derivative thereof (an acid component (A)) as a raw material; and a curing agent component comprising an aliphatic and/or alicyclic isocyanate-based curing agent.

The acid component (A) is preferably a methyltetrahydrophthalic acid, a derivative thereof, a methyltetrahydrophthalic anhydride, or a derivative thereof. In addition, the acid component (A) preferably comprises 50 to 100% by mole and more preferably 60 to 100% by mole of an acid component having a structure selected from the group consisting of (i) and (ii):

(i) a dicarboxylic acid or dicarboxylic anhydride having a carbon atom which is bonded to both groups having the following structures (a) and (b) and also which is bonded to one or two hydrogen atoms, the carbon atom being included in an alicyclic structure:
  (a) a carbon-carbon double bond group; and
  (b) a hetero atom-containing functional group or a linking group derived from the functional group; and
(ii) a dicarboxylic acid or dicarboxylic anhydride in which a carbon atom adjacent to a carbon-carbon double bond in an unsaturated alicyclic structure is bonded to an electron-donating substituent and a hydrogen atom,
  another carbon atom adjacent to the carbon atom is bonded to a hetero atom-containing functional group or a linking group derived from the functional group, and
  the electron-donating substituent and the hetero atom-containing functional group or the linking group derived from the functional group are in a cis configuration.

Each of the above-described structures (i) and (ii) is a molecular structure having particularly excellent reactivity with oxygen because of the substituent effect. Preferred are acid components in which the hetero atom-containing functional group or the linking group derived from the functional group in the above-described structure (i) or (ii) is the dicarboxylic acid or the dicarboxylic anhydride in a tetrahydrophthalic acid or tetrahydrophthalic anhydride structure.

Examples of the acid component having the structure (i) include $\Delta^2$-tetrahydrophthalic acid, derivatives thereof, $\Delta^3$-tetrahydrophthalic acid, derivatives thereof, $\Delta^2$-tetrahydrophthalic anhydride, derivatives thereof, $\Delta^3$-tetrahydrophthalic anhydride, and derivatives thereof. The acid component having the structure (i) is preferably $\Delta^3$-tetrahydrophthalic acid, a derivative thereof, $\Delta^3$-tetrahydrophthalic anhydride, or a derivative thereof, and is particularly preferably 4-methyl-$\Delta^3$-tetrahydrophthalic acid, a derivative thereof, 4-methyl-$\Delta^3$-tetrahydrophthalic anhydride, or a derivative thereof. 4-Methyl-$\Delta^3$-tetrahydrophthalic anhydride can be obtained by, for example, structural isomerization of an isomer mixture which contains 4-methyl-$\Delta^4$-tetrahydrophthalic anhydride and is obtained by a reaction of a $C_5$ fraction of naphtha mainly containing isoprene with maleic anhydride, and has been produced industrially.

The acid component having the structure (ii) is particularly preferably cis-3-methyl-$\Delta^4$-tetrahydrophthalic acid, a derivative thereof, cis-3-methyl-$\Delta^4$-tetrahydrophthalic anhydride, or a derivative thereof. cis-3-Methyl-$\Delta^4$-tetrahydrophthalic anhydride can be obtained by, for example, a reaction of a $C_5$ fraction of naphtha mainly containing trans-piperylene with maleic anhydride, and has been produced industrially.

Many compounds can be shown as examples of the tetrahydrophthalic acid, the derivative thereof, the tetrahydrophthalic anhydride, or the derivative thereof. In particular, acid components having the above-described structure (i) and acid components having the above-described structure (ii) are preferably used because of extremely high reactivity with oxygen. One of these acid components having the structure (i) and these acid components having the structure (ii) can be used alone. It is also preferable to use two or more thereof in combination. A mixture of 4-methyl-$\Delta^3$-tetrahydrophthalic anhydride, which is preferable as the acid component having the structure (i), and cis-3-methyl-$\Delta^4$-tetrahydrophthalic anhydride, which is preferable as the acid component having the structure (ii), can be easily obtained as an industrial product at low costs by a structural isomerization of a mixture of cis-3-methyl-$\Delta^4$-tetrahydrophthalic anhydride and 4-methyl-$\Delta^4$-tetrahydrophthalic anhydride obtained by a reaction of a $C_5$ fraction of naphtha mainly containing trans-piperylene and isoprene with maleic anhydride. In view of industrial application, it is particularly preferable to use such an inexpensive isomer mixture.

In a case where an oxygen-absorbable polyester polyol of the present invention is polymerized by using the tetrahydrophthalic acid, the derivative thereof, the tetrahydrophthalic anhydride, or the derivative thereof as a raw material, the dicarboxylic acid or the dicarboxylic anhydride may be esterified into a methyl ester, or the like.

Moreover, in order to accelerate the oxygen absorption reaction, an oxygen absorption reaction catalyst (an oxidation catalyst) may be added to the polyester polyol of the present invention obtainable by polymerization of raw materials including the tetrahydrophthalic acid, the derivative thereof, the tetrahydrophthalic anhydride, or the derivative thereof. However, since the polyester polyol of the present invention obtainable by polymerization of raw materials including the acid component having the above-described structure (i) and the acid component having the above-described structure (ii) has an extremely high reactivity with oxygen, the polyester polyol of the present invention can exhibit a practical oxygen-absorbing performance even in the absence of the oxygen absorption reaction catalyst. In addition, in order to prevent formation of a gel and the like due to excessive degradation of the resin caused by the oxygen absorption reaction catalyst when an adhesive agent is prepared by using the two-part curable oxygen-absorbable resin composition of the present invention, or when a process is carried out by using the adhesive agent, it is desirable not to contain a catalytic amount of an oxygen absorption reaction catalyst. Here, examples of the oxygen absorption reaction catalyst include transition metal salts made of organic acids and transition metals such as manganese, iron, cobalt, nickel, and copper. In addition, the phrase "not to contain a catalytic amount of an oxygen absorption reaction catalyst" means that the oxygen absorption reaction catalyst is generally less than 10 ppm, and preferably less than 1 ppm in terms of the amount of the transition metal.

In addition to the acid component (A), the polyester polyol of the present invention may further comprise a further acid component (an acid component (B)), such as an aromatic dicarboxylic acid, an aliphatic dicarboxylic acid, an aliphatic hydroxycarboxylic acid, or a derivative thereof as a raw material.

Examples of the aromatic dicarboxylic acid and the derivative thereof include benzenedicarboxylic acids such as terephthalic acid, phthalic anhydride, and isophthalic acid; naphthalenedicarboxylic acids such as 2,6-naphthalenedicarboxylic acid; anthracenedicarboxylic acids; sulfoisophthalic acid; sulfoisophthalic acid sodium salt; derivatives thereof, and the like. Of these examples, benzenedicarboxylic acids are preferable, and terephthalic acid is particularly preferable.

Examples of the aliphatic dicarboxylic acid and the derivative thereof include oxalic acid, malonic acid, succinic acid, glutaric acid, adipic acid, pimelic acid, suberic acid, azelaic acid, sebacic acid, undecanedioic acid, dodecanedioic acid, 3,3-dimethylpentanedioic acid, derivatives thereof, and the like. Of these examples, adipic acid and succinic acid are preferable, and succinic acid is particularly preferable.

Examples of the aliphatic hydroxycarboxylic acid and the derivative thereof include glycolic acid, lactic acid, hydroxypivalic acid, hydroxycaproic acid, hydroxyhexanoic acid, and derivatives thereof.

These acid components may be esterified as in, for example, dimethyl terephthalate and bis-2-hydroxydiethyl terephthalate. Moreover, the acid components may be acid anhydrides as in succinic anhydride. One of these acid components may be used alone, or two or more thereof may be used in combination.

The glass transition temperature of the obtained polyester polyol can be controlled easily by copolymerization with the above-described acid component, and the oxygen-absorbing performance can be improved. Further, it is also possible to control solubility in an organic solvent. Moreover, the viscosity characteristic of the polyester polyol dissolved in a solvent can be adjusted by introducing a polyvalent alcohol and a polycarboxylic acid and thereby controlling the branching structure.

In addition, the acid component (A) is susceptible to a radical cross-linking reaction due to heat during the polymerization. Hence, when the compositional ratio of the acid component (A) contained in the polyester polyol is reduced by the acid component (B), the formation of a gel is suppressed during the polymerization, so that a resin having a high molecular weight can be obtained stably.

The ratio of the acid component (A) is preferably 40 to 95% by mole, and more preferably 60 to 90% by mole, relative to all acid components.

The ratio of the structural unit derived from the acid component (B) is preferably 1 to 30% by mole, and more preferably 5 to 20% by mole, relative to all acid components.

The glass transition temperature of the polyester polyol of the present invention is preferably in a range from $-25°$ C. to $15°$ C., more preferably from $-20°$ C. to $10°$ C., further preferably from $-15°$ C. to $6°$ C., and particularly preferably from $-12°$ C. to $2°$ C., in order to obtain sufficient oxygen-absorbing performance. If the glass transition temperature is below the above-described range, the cohesive force, i.e., the creep resistance, of the resin is lowered. If the glass transition temperature exceeds the above-described range, the adhesion, i.e., the adhesive strength to other materials is lowered. Hence, such cases are not preferable when the two-part curable oxygen-absorbable resin composition of the present invention is used for an adhesive agent.

The polyester polyol of the present invention may further comprise a structural unit derived from a diol component. Examples of the diol component include ethylene glycol, diethylene glycol, triethylene glycol, polyethylene glycol, propylene glycol, dipropylene glycol, polypropylene glycol, trimethylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexanedimethanol, 2-phenylpropanediol, 2-(4-hydroxyphenyl) ethyl alcohol, α,α-dihydroxy-1,3-diisopropylbenzene, o-xylene glycol, m-xylene glycol, p-xylene glycol, α,α-dihydroxy-1,4-diisopropylbenzene, hydroquinone, 4,4-dihydroxydiphenyl, naphthalenediol, derivatives thereof, and the like. Preferred are aliphatic diols such as ethylene glycol, diethylene glycol, triethylene glycol, 1,4-butanediol, 1,6-hexanediol, and neopentyl glycol, and further preferred is 1,4-butanediol. When 1,4-butanediol is used, the oxygen-absorbing performance of the resin is high, and moreover the amount of degradation products generated during the autooxidation is small. One of these diol components can be used alone, or two or more thereof may be used in combination.

The polyester polyol of the present invention may further comprise a structural unit derived from a polyvalent alcohol, a polycarboxylic acid, a derivative thereof, or the like.

Examples of the polyvalent alcohol and the derivative thereof include 1,2,3-propanetriol, sorbitol, 1,3,5-pentanetriol, 1,5,8-heptanetriol, trimethylolpropane, pentaerythritol, 3,5-dihydroxybenzyl alcohol, glycerin, and derivatives thereof.

Examples of the polycarboxylic acid and the derivative thereof include 1,2,3-propanetricarboxylic acid, meso-butane-1,2,3,4-tetracarboxylic acid, citric acid, trimellitic acid, pyromellitic acid, and derivatives thereof.

In addition, when a component having three or more functional groups such as a polyvalent alcohol or a polycarboxylic acid is copolymerized, the component is preferably within 5% by mole relative to all acid components.

The polyester polyol of the present invention can be obtained by any method for polycondensation of a polyester known to those skilled in the art. Examples of the known method include interfacial polycondensation, solution polycondensation, melt polycondensation, and solid-state polycondensation.

A polymerization catalyst is not necessarily required for the synthesis of the polyester polyol of the present invention. However, it is possible to use an ordinary polyester polymerization catalyst such as a titanium-based, germanium-based, antimony-based, tin-based, or aluminum-based polyester polymerization catalyst, for example. Alternatively, it is also possible to use a known polymerization catalyst such as a nitrogen-containing basic compound, boric acid, a boric acid ester, or an organic sulfonic acid-based compound.

Further, it is also possible to add various additives including an anti-coloring agent, an antioxidant, and the like, such as a phosphorus compound, for the polymerization. The addition of an antioxidant makes it possible to reduce oxygen absorption during the polymerization and subsequent processing, so that deterioration in performance of the oxygen-absorbable resin and the formation of a gel can be prevented.

The number average molecular weight of the polyester polyol of the present invention is preferably 500 to 100000, and more preferably 2000 to 10000. Meanwhile, the weight average molecular weight thereof is preferably 5000 to 200000, more preferably 10000 to 100000, and further preferably 20000 to 70000. If the molecular weights are below the above-described ranges, the cohesive force, i.e., the creep resistance, of the resin deteriorates. If the molecular weights exceed the above-described ranges, deterioration in coatability occurs because of decrease in solubility in an organic solvent or increase in solution viscosity. Hence, such molecular weights are not preferable, when the two-part curable oxygen-absorbable resin composition of the present invention is used for an adhesive agent. When the molecular weights are within the above-described ranges, it is possible to obtain an oxygen-absorbable adhesive agent resin composition which is excellent in cohesive force, adhesion, and solubility in an organic solvent, and which has viscosity characteristics preferable for an adhesive agent solution.

The polyester polyol, which is the main agent of the present invention, is used in combination with an aliphatic and/or alicyclic isocyanate-based curing agent component in the form of a two-part curable oxygen-absorbable resin composition. The use of an isocyanate-based curing agent is preferable, because the adhesive strength and the cohesive force are increased, and the isocyanate-based curing agent enables curing at low temperature around room temperature. Examples of the aliphatic diisocyanate-based curing agent include xylylene diisocyanate (XDI), hexamethylene diisocyanate (HDI), lysine diisocyanate, lysine methyl ester diisocyanate, trimethylhexamethylene diisocyanate, n-pentane-1,4-diisocyanate, and the like. Examples of the alicyclic diisocyanate include isophorone diisocyanate (IPDI), cyclohexane-1,4-diisocyanate, methylcyclohexyl diisocyanate, dicyclohexylmethane-4,4'-diisocyanate, and the like. Of these diisocyanate-based curing agents, XDI and HDI are preferable as the aliphatic isocyanate-based curing agents, and IPDI is preferable as the alicyclic isocyanate-based curing agent. XDI and IPDI are particularly preferable. It is also preferable to use a combination of any two or more of IPDI, XDI, and HDI. Here, an IPDI/HDI system or an IPDI/XDI system is particularly preferable. On the other hand, aromatic isocyanate-based curing agents are not preferable, because the aromatic isocyanate-based curing agents remarkably deteriorate the oxygen-absorbing performance of the resin, although the adhesion and the cohesive force thereof are improved. This is presumably because aromatic urethane moieties formed by a reaction of an aromatic isocyanate-based curing agent with terminal hydroxyl groups of the polyester polyol which is the main agent function to inactivate/stabilize radicals, as in the case of an aromatic amine which is an antioxidant.

These aliphatic and/or alicyclic isocyanate-based curing agents are preferably used in the form of a polyisocyanate compound having an increased molecular weight, such as an adduct, an isocyanurate, or a biuret compound.

In addition, one of these aliphatic and/or alicyclic isocyanate-based curing agents may be used alone, or two or more thereof may be used in combination.

It is preferable to add the aliphatic and/or alicyclic isocyanate-based curing agent component in an amount of preferably 3 phr to 30 phr, more preferably 5 phr to 20 phr, and further preferably 7 phr to 15 phr, relative to the polyester polyol, which is the main agent, in terms of parts by weight of the solid content. If the added amount is too small, the adhesion and the cohesive force are insufficient. If the added amount is too large, the amount of the oxygen-absorbable component blended per unit weight of the resin is so small that the oxygen-absorbing performance is insufficient. In addition, when the mobility of the resin is remarkably lowered by curing, the oxygen absorption reaction proceeds less readily, so that the oxygen-absorbing performance deteriorates.

Moreover, the above-described aliphatic and/or alicyclic isocyanate-based curing agent can also be used as a chain extender for increasing the molecular weight of the polyester polyol, which is the main agent. One of these isocyanate-based curing agents may be used alone, or two or more thereof may be used in combination.

The two-part curable oxygen-absorbable resin composition of the present invention can be dissolved in a solvent such as an organic solvent, and used as an oxygen-absorbable adhesive agent. Examples of the solvents include ethyl acetate, acetone, methyl ethyl ketone, methyl isobutyl ketone, toluene, xylene, isopropanol, and the like. In particular, ethyl acetate is generally used as a solvent of an adhesive agent for dry lamination of flexible packaging, because ethyl acetate causes relatively few odor troubles due to residual solvent. Hence, a single solvent of ethyl acetate not containing toluene, xylene, or the like is preferably used as the solvent of the present invention, in consideration of industrial application.

If necessary, various additive such as a silane coupling agent, an antioxidant, an ultraviolet absorber, an anti-hydrolysis agent, a fungicide, a curing catalyst, a thickener, a plasticizer, a pigment, a filler, a polyester resin, and an epoxy resin can be added to the oxygen-absorbable adhesive agent of the present invention, unless the object of the present invention is adversely affected.

The oxygen-absorbable adhesive agent of the present invention can be used for laminating multiple films, as in the case of ordinary adhesive agents for dry lamination. In particular, the oxygen-absorbable adhesive agent of the present invention can be suitably used for laminating a film substrate having oxygen barrier property, and a sealant film having heat sealing property and oxygen gas permeability. In this case, the structure of the laminate includes an oxygen barrier substrate layer/an oxygen-absorbable adhesive layer/a sealant layer form the outer layer side. This structure is preferable because oxygen permeating and penetrating from the outside can be blocked by the oxygen barrier substrate, so that deterioration in oxygen-absorbing performance due to oxygen outside a container can be prevented, and because the oxygen-absorbable adhesive agent can rapidly absorb oxygen inside the container through the oxygen permeable sealant film.

Each of the film substrate having oxygen barrier property and the sealant film may be constituted of a single layer or a laminate. As the film substrate having oxygen barrier property, it is preferable to use a biaxially oriented PET film, a biaxially oriented polyamide film, or a biaxially oriented polypropylene film having, as a barrier layer, a vapor-deposited thin film of a metal or a metal oxide such as silica or alumina, a barrier coating layer mainly composed of a gas-barrier organic material such as a polyvinyl alcohol-based resin, an ethylene-vinyl alcohol copolymer, a polyacrylic acid-based resin, or a vinylidene chloride-based resin, or the like. Moreover, an ethylene-vinyl alcohol copolymer film, a poly(meta-xylylene adipamide) film, a polyvinylidene chloride-based film, or a metal foil such as an aluminum foil is also preferable. It is possible to use a laminate of substrates of a single kind or substrate of two or more kinds of these film substrates having oxygen barrier property. In addition, it is also preferable to use the film substrate after a biaxially oriented PET film, a biaxially oriented polyamide film, a biaxially oriented polypropylene film, cellophane, paper, or the like is laminated on the film substrate.

Examples of the material preferably used for the sealant film include low-density polyethylene, medium-density polyethylene, high-density polyethylene, linear low-density polyethylene, linear ultra-low-density polyethylene, polypropylene, poly-1-butene, poly-4-methyl-1-pentene, cyclic olefin polymers, cyclic olefin copolymers, polyolefins including random or block copolymers of α-olefins such as ethylene, propylene, 1-butene, and 4-methyl-1-pentene, and the like, ethylene-vinyl acetate copolymers, ethylene-(meth)acrylic acid copolymers, ionically cross-linked products (ionomers) thereof, ethylene-vinyl compound copolymers such as ethylene-methyl methacrylate copolymers, polyesters having heat sealing property such as PET, A-PET, PETG, and PBT, amorphous nylon, and the like. A blend of two or more of these materials can also be used, or a laminate of a single material or different materials can be used.

A known dry laminator can be used to laminate multiple film substrates by using the oxygen-absorbable adhesive agent of the present invention. With a dry laminator, it is possible to carry out a series of laminating processes including application of the oxygen-absorbable adhesive agent onto a barrier film substrate, solvent vaporization with a drying oven, and lamination with a sealant film by nip rolls heated at 50 to 120° C. The amount of the oxygen-absorbable adhesive agent applied is 0.1 to 30 $g/m^2$, preferably 1 to 15 $g/m^2$, and further preferably 2 to 10 $g/m^2$, in terms of solid content. An oxygen-absorbable laminate film laminated by using the oxygen-absorbable adhesive agent is preferably aged at a temperature around room temperature, for example, at 10 to 60° C., in order to promote the curing reaction. The curing is caused by a cross-linking reaction with the curing agent such as an organic diisocyanate, and is preferable because the curing results in improved adhesive strength and cohesive force. Note that the aging is preferably conducted in the absence of oxygen or under blocking of oxygen by tightly sealing the oxygen-absorbable laminate film with, for example, an oxygen-impermeable bag or the like. Thus, deterioration in oxygen-absorbing performance due to oxygen in the air can be prevented during the aging.

Moreover, the two-part curable oxygen-absorbable resin composition of the present invention can also be used as a solventless adhesive agent, without being dissolved in a solvent. In this case, the oxygen-absorbable laminate film can be obtained by using a known non-solvent laminator.

Further, the two-part curable oxygen-absorbable resin composition of the present invention can be used not only in adhesive agent applications, but also in coating material applications, and can be applied as coating films for various films and the like.

An oxygen-absorbable laminate film laminated by using the oxygen-absorbable adhesive agent of the present invention can be suitably used for bag-shaped containers with various shapes and lid members for cup or tray containers. Examples of the bag-shaped containers include three-side or four-side sealed flat pouches, pouches with gusset, standing pouches, pillow packaging bags, and the like.

An oxygen-absorbing container in which the oxygen-absorbable laminate film is used in at least a part of the oxygen-absorbing container effectively blocks oxygen permeating from the outside of the container, and absorbs oxygen remaining in the container. For this reason, the oxygen-absorbing container is useful as a container which improves the shelf-life of a content by keeping the oxygen concentration in the container at a low level for a long period, and thus preventing deterioration in quality of the content due to oxygen.

In particular, examples of contents susceptible to deterioration in the presence of oxygen include foods such as coffee beans, tea leaves, snacks, rice confectionery products, raw or semi-raw confectionery products, fruits, nuts, vegetables, fish or meat products, paste products, dried fish, smoked foods, Tsukudani (Japanese simmered foods), raw rice, cooked rice food products, infant foods, jams, mayonnaises, ketchups, edible oils, dressings, sources, and dairy products; beverages such as beers, wines, fruit juices, green teas, and coffees; and other contents such as pharmaceuticals, cosmetics, electronic components; and the like. However, the contents are not limited to these examples.

EXAMPLES

Hereinafter, the present invention is described more specifically based on Examples. Values were measured by the following methods.
(1) Number Average Molecular Weight (Mn) and Weight Average Molecular Weight (Nw)

Measurement was conducted by gel permeation chromatography (GPC, an HLC-8120 model GPC manufactured by Tosoh Corporation) in terms of polystyrene. Chloroform was used as the solvent.
(2) Compositional Ratio of Monomer Units in Oxygen-Absorbing Polyester Resin By nuclear magnetic resonance spectroscopy (1 H-NMR, EX270 manufactured by JEOL DATUM Ltd.), the compositional ratio of acid components in each resin was calculated from the area ratio of signals of benzene ring protons (8.1 ppm) derived from terephthalic acid, benzene ring protons (8.7 ppm) derived from isophthalic acid, methylene protons (2.6 ppm) derived from succinic acid, methylene protons (4.3 to 4.4 ppm) adjacent to ester groups derived from terephthalic acid and isophthalic acid, and methylene protons (4.1 to 4.2 ppm) adjacent to ester groups derived from methyltetrahydrophthalic anhydride and succinic acid. Deuterated chloroform containing tetramethylsilane as a reference substance was used as the solvent.

Here, the compositional ratio of the acid components in each resin was almost equivalent to the feed amounts (molar ratio) of monomers used for polymerization.
(3) Glass Transition Temperature: Tg Measurement was conducted by using a differential scanning calorimeter (DSC6220 manufactured by Seiko Instruments Inc.) under a nitrogen stream at a rate of temperature rise of 10° C./minute.
(4) Amount of Oxygen Absorbed A test piece of 2 cm×10 cm cut from a laminate film was placed in an oxygen-impermeable steel foil laminate cup having an internal volume of 85 cm$^3$, tightly sealed with an aluminum foil laminate film lid by heat sealing, and stored under an atmosphere of 22° C. The oxygen concentration in the cup after a 14-day storage was measured with a micro gas chromatograph (M200 manufactured by Agilent Technologies, Inc.), and the amount of oxygen absorbed per square centimeter of the film was calculated. An amount of 0.015 ml/cm$^2$ or more was evaluated as good (G), whereas an amount less than 0.015 ml/cm$^2$ was evaluated as poor (P).
(5) Creep Resistance A T-peel creep test between aluminum foil and LDPE was conducted under an atmosphere of 40° C. with a test piece width of 25 mm and a load of 50 g, and a peel length (unit: mm) was measured 2 hours later. A peel length of 30 mm or more was evaluated as poor (P), whereas a peel length less than 30 mm was evaluated as good (G).

Example 1

Into a 3-L separable flask equipped with a stirrer, a nitrogen inlet, and a Dean-Stark water separator, 349 g of a methyltet-rahydrophthalic anhydride isomer mixture (HN-2200 manufactured by Hitachi Chemical Co., Ltd.) containing 45% by mole of 4-methyl-$\Delta^3$-tetrahydrophthalic anhydride and 21% by mole of cis-3-methyl -$\Delta^4$-tetrahydrophthalic anhydride, 150 g of terephthalic acid (manufactured by Wako Pure Chemical Industries, Ltd.), 487 g of 1,4-butanediol (manufactured by Wako Pure Chemical Industries, Ltd.), 296 mg of isopropyl titanate (manufactured by KISHIDA CHEMICAL Co., Ltd.) as a polymerization catalyst, and 20 ml of toluene were introduced. Then, a reaction was allowed to proceed for approximately 6 hours in a nitrogen atmosphere at 150° C. to 200° C., while the produced water was being removed. Subsequently, toluene was removed from the reaction system, and then polymerization was conducted under a reduced pressure of 0.1 kPa at 200 to 220° C. for 2 hours. Thus, an oxygen-absorbable polyester resin was obtained. Here, the Mn was approximately 4800, the Mw was approximately 47500, and the Tg was 5.7° C.

The obtained oxygen-absorbable resin was dissolved in ethyl acetate at a concentration of 20% by weight at room temperature (hereinafter, this solution is referred to as Base Solution A). With this Base Solution A, an alicyclic isocyanate-based curing agent (IPDI isocyanurate-based curing agent) was mixed in an amount of 7 phr (parts per hundred resin) in terms of solid content, and the mixture was shaken. Thus, an oxygen-absorbable adhesive agent solution was prepared. The prepared adhesive agent solution was applied by using a #18 bar coater onto an aluminum foil surface of a laminate film including a biaxially oriented PET film (film thickness: 12 µm)/an aluminum foil (film thickness: 7 µm). The solvent contained in the adhesive agent was evaporated with hot air of a hair dryer, and then the laminate film and a 30-µm LDPE film (AJ-3 manufactured by TAMAPOLY CO., LTD.) were passed through hot rolls at 70° C., with the surface of the laminate film on which the adhesive agent was applied and a corona-treated surface of the 30-µm LDPE film being faced to each other. Thus, an oxygen-absorbable laminate film was obtained which included the biaxially oriented PET film (film thickness: 12 µm)/the aluminum foil (film thickness: 7 µm)/the oxygen-absorbable adhesive agent (film thickness: 4 µm)/the 30-µm LDPE.

The obtained oxygen-absorbable laminate film was stored at 35° C. under a nitrogen atmosphere for 5 days, and then subjected to the evaluation of the amount of oxygen absorbed and the evaluation of the creep resistance. Table 1 shows the results.

Example 2

With Base Solution A, an alicyclic and aliphatic mixture isocyanate-based curing agent (an IPDI adduct/XDI adduct-based curing agent) was mixed in an amount of 7 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 3

Into a 3-L separable flask equipped with a stirrer, a nitrogen inlet, and a Dean-Stark water separator, 399 g of a methyltet-rahydrophthalic anhydride isomer mixture (HN-2200 manufactured by Hitachi Chemical Co., Ltd.) containing 45% by mole of 4-methyl-$\Delta^3$-tetrahydrophthalic anhydride and 21% by mole of cis-3-methyl-$\Delta^4$-tetrahydrophthalic anhydride, 50 g of terephthalic acid (manufactured by Wako Pure Chemical Industries, Ltd.), 30 g of succinic anhydride (manufactured by Wako Pure Chemical Industries, Ltd.), 379 g of 1,4-butanediol (manufactured by Wako Pure Chemical Industries, Ltd.), 257 mg of isopropyl titanate (manufactured by KISHIDA CHEMICAL Co., Ltd.) as a polymerization catalyst, and 20 ml of toluene were introduced. Then, a reaction was allowed to proceed for approximately 6 hours in a nitrogen atmosphere at 150° C. to 200° C., while the produced water was being removed. Subsequently, toluene was removed from the reaction system, and then polymerization was conducted under a reduced pressure of 0.1 kPa at 200 to 220° C. for 3 hours. Thus, an oxygen-absorbable polyester resin was obtained. Here, the Mn was approximately 4400, the Mw was approximately 57200, and the Tg was −2.2° C.

The obtained oxygen-absorbable resin was dissolved in ethyl acetate at a concentration of 20% by weight at room temperature (hereinafter, this solution is referred to as Base Solution B). With the Base Solution B, an alicyclic isocyanate-based curing agent (an IPDI isocyanurate-based curing agent) was mixed in an amount of 7 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 4

An oxygen-absorbable adhesive agent solution was prepared in the same manner as in Example 3, except that the amount of the alicyclic isocyanate-based curing agent mixed with Base Solution B was 10 phr in terms of solid content. An oxygen-absorbable film was fabricated by using the prepared adhesive agent solution in the same manner as in Example 1, and subjected to the evaluations after storage. Table 1 shows the results.

Example 5

With Base Solution B, an alicyclic and aliphatic mixture isocyanate-based curing agent (an IPDI adduct/XDI adduct-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 6

With Base Solution B, an aliphatic isocyanate-based curing agent (an HDI adduct-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 7

Into a 3-L separable flask equipped with a stirrer, a nitrogen inlet, and a Dean-Stark water separator, 399 g of a methyltetrahydrophthalic anhydride isomer mixture (HN-2200 manufactured by Hitachi Chemical Co., Ltd.) containing 45% by mole of 4-methyl-$\Delta^3$-tetrahydrophthalic anhydride and 21% by mole of cis-3-methyl-$\Delta^4$-tetrahydrophthalic anhydride, 25 g of terephthalic acid (manufactured by Wako Pure Chemical Industries, Ltd.), 45 g of succinic anhydride (manufactured by Wako Pure Chemical Industries, Ltd.), 379 g of 1,4-butanediol (manufactured by Wako Pure Chemical Industries, Ltd.), 254 mg of isopropyl titanate (manufactured by KISHIDA CHEMICAL Co., Ltd.) as a polymerization catalyst, and 20 ml of toluene were introduced. Then, a reaction was allowed to proceed for approximately 6 hours in a nitrogen atmosphere at 150° C. to 200° C., while the produced water was being removed. Subsequently, toluene was removed from the reaction system, and then polymerization was conducted under a reduced pressure of 0.1 kPa at 200 to 220° C. for 3 hours. Thus, an oxygen-absorbable polyester resin was obtained. Here, the Mn was approximately 4600, the Mw was approximately 56900, and the Tg was −5.3° C.

The obtained oxygen-absorbable resin was dissolved in ethyl acetate at a concentration of 20% by weight at room temperature (hereinafter, this solution is referred to as Base Solution C). With this Base Solution C, an alicyclic isocyanate-based curing agent (an IPDI isocyanurate-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 8

Into a 3-L separable flask equipped with a stirrer, a nitrogen inlet, and a Dean-Stark water separator, 399 g of a methyltetrahydrophthalic anhydride isomer mixture (HN-2000 manufactured by Hitachi Chemical Co., Ltd.) containing 2% by mole of 4-methyl-$\Delta^3$-tetrahydrophthalic anhydride and 13% by mole of cis-3-methyl -$\Delta^4$-tetrahydrophthalic anhydride, 25 g of terephthalic acid (manufactured by Wako Pure Chemical Industries, Ltd.), 45 g of succinic anhydride (manufactured by Wako Pure Chemical Industries, Ltd.), 379 g of 1,4-butanediol (manufactured by Wako Pure Chemical Industries, Ltd.), 254 mg of isopropyl titanate (manufactured by KISHIDA CHEMICAL Co., Ltd.) as a polymerization catalyst, and 20 ml of toluene were introduced. Then, a reaction was allowed to proceed for approximately 6 hours in a nitrogen atmosphere at 150° C. to 200° C., while the produced water was being removed. Subsequently, toluene was removed from the reaction system, and then polymerization was conducted under a reduced pressure of 0.1 kPa at 200 to 220° C. for 3 hours. Thus, an oxygen-absorbable polyester resin was obtained. Here, the Mn was approximately 5000, the Mw was approximately 60000, and the Tg was −5.0° C.

The obtained oxygen-absorbable resin was dissolved in ethyl acetate at a concentration of 20% by weight at room temperature (hereinafter, this solution is referred to as Base Solution D). With this Base Solution D, an alicyclic isocyanate-based curing agent (an IPDI isocyanurate-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 9

Into a 3-L separable flask equipped with a stirrer, a nitrogen inlet, and a Dean-Stark water separator, 399 g of cis-3-methyl-$\Delta^4$-tetrahydrophthalic anhydride (manufactured by Tokyo Chemical Industry Co., Ltd.), 25 g of terephthalic acid (manufactured by Wako Pure Chemical Industries, Ltd.), 45 g of succinic anhydride (manufactured by Wako Pure Chemical Industries, Ltd.), 379 g of 1,4-butanediol (manufactured by Wako Pure Chemical Industries, Ltd.), 254 mg of isopropyl titanate (manufactured by KISHIDA CHEMICAL Co., Ltd.) as a polymerization catalyst, and 20 ml of toluene were introduced. Then, a reaction was allowed to proceed for approximately 6 hours in a nitrogen atmosphere at 150° C. to 200° C., while the produced water was being removed. Subsequently, toluene was removed from the reaction system, and then polymerization was conducted under a reduced pressure of 0.1 kPa at 200 to 220° C. for 3 hours. Thus, an oxygen-absorbable polyester resin was obtained. Here, the Mn was approximately 5000, the Mw was approximately 60000, and the Tg was –3.0.

The obtained oxygen-absorbable resin was dissolved in ethyl acetate at a concentration of 20% by weight at room temperature (hereinafter, this solution is referred to as Base Solution E). With this Base Solution E, an alicyclic isocyanate-based curing agent (an IPDI isocyanurate-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 10

Into a 3-L separable flask equipped with a stirrer, a nitrogen inlet, and a Dean-Stark water separator, 399 g of a methyltetrahydrophthalic anhydride isomer mixture (HN-2200 manufactured by Hitachi Chemical Co., Ltd.) containing 45% by mole of 4-methyl-$\Delta^3$-tetrahydrophthalic anhydride and 21% by mole of cis-3-methyl -$\Delta^4$-tetrahydrophthalic anhydride, 60 g of succinic anhydride (manufactured by Wako Pure Chemical Industries, Ltd.), 379 g of 1,4-butanediol (manufactured by Wako Pure Chemical Industries, Ltd.), 251 mg of isopropyl titanate (manufactured by KISHIDA CHEMICAL Co., Ltd.) as a polymerization catalyst, and 20 ml of toluene were introduced. Then, a reaction was allowed to proceed for approximately 6 hours in a nitrogen atmosphere at 150° C. to 200° C., while the produced water was being removed. Subsequently, toluene was removed from the reaction system, and then polymerization was conducted under a reduced pressure of 0.1 kPa at 200 to 220° C. for 3 hours. Thus, an oxygen-absorbable polyester resin was obtained. Here, the Mn was approximately 3800, the Mw was approximately 57800, and the Tg was –8.5° C.

The obtained oxygen-absorbable resin was dissolved in ethyl acetate at a concentration of 20% by weight at room temperature (hereinafter, this solution is referred to as Base Solution F). With this Base Solution F, an alicyclic isocyanate-based curing agent (an IPDI isocyanurate-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 11

An oxygen-absorbable adhesive agent solution was prepared in the same manner as in Example 10, except that the amount of the alicyclic isocyanate-based curing agent mixed with Base Solution F was 20 phr in terms of solid content. An oxygen-absorbable film was fabricated by using the prepared adhesive agent solution in the same manner as in Example 1, and subjected to the evaluations after storage. Table 1 shows the results.

Example 12

With Base Solution F, an alicyclic and aliphatic mixture isocyanate-based curing agent (an IPDI adduct/XDI adduct-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 13

With Base Solution F, an aliphatic isocyanate-based curing agent (an HDI adduct-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 14

Into a 3-L separable flask equipped with a stirrer, a nitrogen inlet, and a Dean-Stark water separator, 449 g of a methyltetrahydrophthalic anhydride isomer mixture (HN-2200 manufactured by Hitachi Chemical Co., Ltd.) containing 45% by mole of 4-methyl-$\Delta^3$-tetrahydrophthalic anhydride and 21% by mole of cis-3-methyl -$\Delta^4$-tetrahydrophthalic anhydride, 30 g of succinic anhydride (manufactured by Wako Pure Chemical Industries, Ltd.), 351 g of 1,4-butanediol (manufactured by Wako Pure Chemical Industries, Ltd.), 249 mg of isopropyl titanate (manufactured by KISHIDA CHEMICAL Co., Ltd.) as a polymerization catalyst, and 20 ml of toluene were introduced. Then, a reaction was allowed to proceed for approximately 6 hours in a nitrogen atmosphere at 150° C. to 200° C., while the produced water was being removed. Subsequently, toluene was removed from the reaction system, and then polymerization was conducted under a reduced pressure of 0.1 kPa at 200 to 220° C. for 3 hours. Thus, an oxygen-absorbable polyester resin was obtained. Here, the Mn was approximately 3700, the Mw was approximately 56800, and the Tg was –4.2° C.

The obtained oxygen-absorbable resin was dissolved in ethyl acetate at a concentration of 20% by weight at room temperature (hereinafter, this solution is referred to as Base Solution G). With this Base Solution G, an alicyclic isocyanate-based curing agent (an IPDI isocyanurate-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 15

An oxygen-absorbable adhesive agent solution was prepared in the same manner as in Example 14, except that the amount of the alicyclic isocyanate-based curing agent mixed with Base Solution G was 15 phr in terms of solid content. An oxygen-absorbable film was fabricated by using the prepared adhesive agent solution in the same manner as in Example 1, and subjected to the evaluations after storage. Table 1 shows the results.

Example 16

An oxygen-absorbable adhesive agent solution was prepared in the same manner as in Example 14, except that the amount of the alicyclic isocyanate-based curing agent mixed with Base Solution G was 20 phr in terms of solid content. An oxygen-absorbable film was fabricated by using the prepared adhesive agent solution in the same manner as in Example 1, and subjected to the evaluations after storage. Table 1 shows the results.

Example 17

With Base Solution G, an alicyclic and aliphatic mixture isocyanate-based curing agent (an IPDI adduct/XDI adduct-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Example 18

An oxygen-absorbable adhesive agent solution was prepared in the same manner as in Example 17, except that the amount of the alicyclic and aliphatic mixture isocyanate-based curing agent blended with Base Solution G was 15 phr in terms of solid content. An oxygen-absorbable film was fabricated by using the prepared adhesive agent solution in the same manner as in Example 1, and subjected to the evaluations after storage. Table 1 shows the results.

Example 19

An oxygen-absorbable adhesive agent solution was prepared in the same manner as in Example 17, except that the amount of the alicyclic and aliphatic mixture isocyanate-based curing agent blended with Base Solution G was 20 phr in terms of solid content. An oxygen-absorbable film was fabricated by using the prepared adhesive agent solution in the same manner as in Example 1, and subjected to the evaluations after storage. Table 1 shows the results.

Comparative Example 1

An oxygen-absorbable film was fabricated in the same manner as in Example 1, except that no curing agent was added to Base Solution A. Then, the oxygen-absorbable film was subjected to the evaluations after storage. Table 1 shows the results.

Comparative Example 2

An oxygen-absorbable film was fabricated in the same manner as in Example 3, except that no curing agent was added to Base Solution B. Then, the oxygen-absorbable film was subjected to the evaluations after storage. Table 1 shows the results.

Comparative Example 3

An oxygen-absorbable film was fabricated in the same manner as in Example 7, except that no curing agent was added to Base Solution C. Then, the oxygen-absorbable film was subjected to the evaluations after storage. Table 1 shows the results.

Comparative Example 4

An oxygen-absorbable film was fabricated in the same manner as in Example 8, except that no curing agent was added to Base Solution D. Then, the oxygen-absorbable film was subjected to the evaluations after storage. Table 1 shows the results.

Comparative Example 5

An oxygen-absorbable film was fabricated in the same manner as in Example 9, except that no curing agent was added to Base Solution E. Then, the oxygen-absorbable film was subjected to the evaluations after storage. Table 1 shows the results.

Comparative Example 6

An oxygen-absorbable film was fabricated in the same manner as in Example 10, except that no curing agent was added to Base Solution F. Then, the oxygen-absorbable film was subjected to the evaluations after storage. Table 1 shows the results.

Comparative Example 7

An oxygen-absorbable film was fabricated in the same manner as in Example 14, except that no curing agent was added to Base Solution G. Then, the oxygen-absorbable film was subjected to the evaluations after storage. Table 1 shows the results.

Comparative Example 8

With Base Solution A, an aromatic isocyanate-based curing agent A (a TDI (tolylene diisocyanate)/polyester-based curing agent) was mixed in an amount of 7 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Comparative Example 9

With Base Solution B, an aromatic isocyanate-based curing agent A (a TDI/polyester-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Comparative Example 10

With Base Solution C, an aromatic isocyanate-based curing agent A (a TDI/polyester-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Comparative Example 11

With Base Solution D, an aromatic isocyanate-based curing agent A (a TDI/polyester-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Comparative Example 12

With Base Solution E, an aromatic isocyanate-based curing agent A (a TDI/polyester-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Comparative Example 13

With Base Solution F, an aromatic isocyanate-based curing agent A (a TDI/polyester-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Comparative Example 14

With Base Solution G, an aromatic isocyanate-based curing agent A (a TDI/polyester-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

Comparative Example 15

With Base Solution G, an aromatic isocyanate-based curing agent B (a TDI adduct-based curing agent) was mixed in an amount of 10 phr in terms of solid content, and the mixture was shaken. Thus, an oxygen-absorbable adhesive agent solution was prepared. An oxygen-absorbable film was fabricated by using the prepared adhesive agent solution in the same manner as in Example 1, and subjected to the evaluations after storage. Table 1 shows the results.

TABLE 1

| | Base Solution | Curing agent Kind (based on) | Added amount phr | Oxygen-absorbing performance 14-day period ml/cm2 | Evaluation | Creep resistance mm | Evaluation | Overall evaluation |
|---|---|---|---|---|---|---|---|---|
| Example 1 | A | Alicyclic isocyanate | 7 | 0.017 | G | 0 | G | G |
| Example 2 | A | Alicyclic/aliphatic isocyanate | 7 | 0.019 | G | 0 | G | G |
| Example 3 | B | Alicyclic isocyanate | 7 | 0.034 | G | 0 | G | G |
| Example 4 | B | | 10 | 0.029 | G | 0 | G | G |
| Example 5 | B | Alicyclic/aliphatic isocyanate | 10 | 0.033 | G | 0 | G | G |
| Example 6 | B | Alicyclic isocyanate | 10 | 0.027 | G | 0 | G | G |
| Example 7 | C | Alicyclic isocyanate | 10 | 0.036 | G | 0 | G | G |
| Example 8 | D | Alicyclic isocyanate | 10 | 0.030 | G | 0 | G | G |
| Example 9 | E | Alicyclic isocyanate | 10 | 0.045 | G | 0 | G | G |
| Example 10 | F | Alicyclic isocyanate | 10 | 0.038 | G | 0 | G | G |
| Example 11 | F | | 20 | 0.034 | G | 0 | G | G |
| Example 12 | F | Alicyclic/aliphatic isocyanate | 10 | 0.040 | G | 0 | G | G |
| Example 13 | F | Aliphatic isocyanate | 10 | 0.030 | G | 0 | G | G |
| Example 14 | G | Alicyclic isocyanate | 10 | 0.033 | G | 0 | G | G |
| Example 15 | G | | 15 | 0.030 | G | 0 | G | G |
| Example 16 | G | | 20 | 0.027 | G | 0 | G | G |
| Example 17 | G | Alicyclic/aliphatic isocyanate | 10 | 0.037 | G | 0 | G | G |
| Example 18 | G | | 15 | 0.033 | G | 0 | G | G |
| Example 19 | G | | 20 | 0.031 | G | 0 | G | G |
| Comp. Ex. 1 | A | — | — | 0.032 | G | >30 | P | P |
| Comp. Ex. 2 | B | — | — | 0.036 | G | >30 | P | P |
| Comp. Ex. 3 | C | — | — | 0.032 | G | >30 | P | P |
| Comp. Ex. 4 | D | — | — | 0.027 | G | >30 | P | P |
| Comp. Ex. 5 | E | — | — | 0.040 | G | >30 | P | P |
| Comp. Ex. 6 | F | — | — | 0.006 | P | >30 | P | P |
| Comp. Ex. 7 | G | — | — | 0.003 | P | >30 | P | P |
| Comp. Ex. 8 | A | Aromatic isocyanate A | 7 | 0.003 | P | 0 | G | P |
| Comp. Ex. 9 | B | Aromatic isocyanate A | 10 | 0.000 | P | 0 | G | P |

TABLE 1-continued

|  | Base Solution | Curing agent | | Oxygen-absorbing performance | | Creep resistance | | Overall evaluation |
|---|---|---|---|---|---|---|---|---|
|  |  | Kind (based on) | Added amount phr | 14-day period ml/cm2 | Evaluation | mm | Evaluation |  |
| Comp. Ex. 10 | C | Aromatic isocyanate A | 10 | 0.000 | P | 0 | G | P |
| Comp. Ex. 11 | D | Aromatic isocyanate A | 10 | 0.000 | P | 0 | G | P |
| Comp. Ex. 12 | E | Aromatic isocyanate A | 10 | 0.000 | P | 0 | G | P |
| Comp. Ex. 13 | F | Aromatic isocyanate A | 10 | 0.000 | P | 0 | G | P |
| Comp. Ex. 14 | G | Aromatic isocyanate A | 10 | 0.000 | P | 0 | G | P |
| Comp. Ex. 15 | G | Aromatic isocyanate B | 10 | 0.009 | P | 0 | G | P |

INDUSTRIAL APPLICABILITY

A flexible packaging material having excellent oxygen removal performance can be easily produced by using an oxygen-absorbable adhesive agent using the two-part curable oxygen-absorbable resin composition of the present invention as an alternative to conventional adhesive agents for dry lamination. The oxygen-absorbing flexible packaging material makes it possible to keep for long periods the qualities of foods, pharmaceuticals, electronic components, and the like which are sensitive to oxygen.

The invention claimed is:

1. A two-part curable oxygen-absorbable resin composition comprising:
   a main agent consisting of a polyester polyol comprising a tetrahydrophthalic acid, a derivative thereof, a tetrahydrophthalic anhydride, or a derivative thereof as a raw material; and
   an aliphatic and/or alicyclic isocyanate-based curing agent component in an amount of 3 phr to 30 phr relative to the polyester polyol in terms of parts by weight of a solid content of the composition,
   wherein the tetrahydrophthalic acid, the derivative thereof, the tetrahydrophthalic anhydride, or the derivative thereof comprises 50% by mole or more of an acid component selected from the group consisting of:
   4-methyl-$\Delta^3$-tetrahydrophthalic acid, derivatives thereof, 4-methyl-$\Delta^3$-tetrahydrophthalic anhydride, derivatives thereof, cis-3-methyl-$\Delta^4$-tetrahydrophthalic acid, derivatives thereof, cis-3-methyl-$\Delta^4$-tetrahydrophthalic anhydride, and derivatives thereof.

2. The two-part curable oxygen-absorbable resin composition according to claim 1, wherein the polyester polyol comprising the tetrahydrophthalic acid, the derivative thereof, the tetrahydrophthalic anhydride, or the derivative thereof as the raw material has a glass transition temperature of −20° C. to 10° C.

3. The two-part curable oxygen-absorbable resin composition according to claim 1, wherein the aliphatic and/or alicyclic isocyanate-based curing agent component comprises an isophorone diisocyanate and/or xylylene diisocyanate component.

4. An oxygen-absorbable adhesive agent comprising the two-part curable oxygen-absorbable resin composition according to claim 1.

5. An oxygen-absorbable laminate film comprising at least:
   an oxygen barrier film layer;
   an oxygen-absorbable layer made of the oxygen-absorbable adhesive agent according to claim 4; and
   a sealant film layer.

* * * * *